(12) United States Patent
Nagashima (10) Patent No.: US 9,721,492 B2
(45) Date of Patent: Aug. 1, 2017

(54) IMAGE DISPLAY APPARATUS AND METHOD OF CONTROLLING IMAGE DISPLAY APPARATUS

(71) Applicant: CANON KABUSHIKI KAISHA, Tokyo (JP)

(72) Inventor: Yoshiyuki Nagashima, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 104 days.

(21) Appl. No.: 14/704,434

(22) Filed: May 5, 2015

(65) Prior Publication Data

US 2015/0325178 A1 Nov. 12, 2015

(30) Foreign Application Priority Data

May 7, 2014 (JP) .................. 2014-095749

(51) Int. Cl.

| | |
|---|---|
| *G09G 3/34* | (2006.01) |
| *G09G 3/36* | (2006.01) |
| *G09G 3/20* | (2006.01) |
| *H04N 5/14* | (2006.01) |
| *H04N 21/431* | (2011.01) |
| *H04N 5/57* | (2006.01) |

(52) U.S. Cl.
CPC .............. *G09G 3/20* (2013.01); *G09G 3/34* (2013.01); *G09G 3/3413* (2013.01); *G09G 3/36* (2013.01); *G09G 3/3607* (2013.01); *H04N 5/14* (2013.01); *H04N 21/4318* (2013.01); *G09G 2320/0233* (2013.01); *G09G 2320/0242* (2013.01); *G09G 2320/0646* (2013.01); *G09G 2320/0673* (2013.01); *H04N 5/57* (2013.01)

(58) Field of Classification Search
None
See application file for complete search history.

(56) References Cited

U.S. PATENT DOCUMENTS

| | | | |
|---|---|---|---|
| 2008/0030450 A1* | 2/2008 | Yamagishi | ............... G09G 3/20 345/89 |
| 2009/0274368 A1* | 11/2009 | Watanabe | .......... G06K 9/00221 382/167 |
| 2011/0157247 A1 | 6/2011 | Tanaka et al. | |

FOREIGN PATENT DOCUMENTS

| | | |
|---|---|---|
| JP | 2007-114427 A | 5/2007 |
| JP | 2008-310261 A | 12/2008 |

* cited by examiner

*Primary Examiner* — Kee M Tung
*Assistant Examiner* — Yanna Wu
(74) *Attorney, Agent, or Firm* — Cowan, Liebowitz & Latman, P.C.

(57) ABSTRACT

An image display apparatus according to the present invention includes: an acquisition unit configured to acquire a size of a flat region on the basis of an input image, this flat region, from among regions of the input image, being a region in which a change in gradation value in a spatial direction of the image is small; and an image processing unit configured to perform unevenness reduction processing on the input image, this unevenness reduction processing reducing at least one of brightness unevenness and color unevenness of a screen at a higher reduction degree as the flat region is larger in size.

19 Claims, 5 Drawing Sheets

IMAGE DISPLAY APPARATUS AND METHOD OF CONTROLLING IMAGE DISPLAY APPARATUS

BACKGROUND OF THE INVENTION

Field of the Invention

The present invention relates to an image display apparatus and a method of controlling the image display apparatus.

Description of the Related Art

In an image display apparatus, brightness unevenness and color unevenness appear on a screen due to the characteristics of a display panel and the structure of the image display apparatus. In an image display apparatus such as a liquid-crystal display (LCD) apparatus that displays an image on a screen using light emitted from a light-emission unit, brightness unevenness and color unevenness appear on the screen due to the characteristics of the light-emission unit (backlight).

For example, the brightness unevenness appearing on the screen of the image display apparatus is that brightness reduces from the center to the end of the screen. Note that the brightness unevenness is not limited to this but may appear in various ways depending on the characteristics of the display panel, the structure of the image display apparatus, the characteristics of the light-emission unit, or the like.

Technology for reducing the unevenness of the screen is disclosed in, for example, Japanese Patent Application Laid-open No. 2007-114427.

In the technology of Japanese Patent Application Laid-open No. 2007-114427, each gradation value of an input image is corrected such that the brightness of each position of the screen coincides with the brightness of the end (the position having the lowest brightness) thereof.

According to the technology disclosed in Japanese Patent Application Laid-open No. 2007-114427, however, the brightness of each position of the screen is reduced such that the brightness of each position of the screen coincides with the brightness of the end thereof. Therefore, the reduction in the brightness unevenness of the screen results in reduction in the brightness of the entire screen, whereby the dynamic range of a display image (image displayed on the screen) is reduced.

Technology for suppressing the reduction in the brightness of the screen due to the reduction in the unevenness is disclosed in, for example, Japanese Patent Application Laid-open No. 2008-310261.

In the technology of Japanese Patent Application Laid-open No. 2008-310261, each gradation value of an input image is corrected with a smaller correction amount when a color component is larger in intensity. Therefore, the reduction in the brightness of the screen due to the reduction in the unevenness may be suppressed with a higher suppression degree when a color component is larger in intensity.

According to the technology disclosed in Japanese Patent Application Laid-open No. 2008-310261, however, each gradation value of an input image is corrected with a smaller correction amount when a color component is larger in intensity. Therefore, when each gradation value of the input image is large, the unevenness may not be reduced with high accuracy.

SUMMARY OF THE INVENTION

The present invention provides technology capable of reducing unevenness with high accuracy and suppressing reduction in the brightness of a screen due to the reduction in the unevenness.

The present invention in its first aspect provides an image display apparatus comprising:

an acquisition unit configured to acquire a size of a flat region on the basis of an input image, this flat region, from among regions of the input image, being a region in which a change in gradation value in a spatial direction of the image is small; and an image processing unit configured to perform unevenness reduction processing on the input image, this unevenness reduction processing reducing at least one of brightness unevenness and color unevenness of a screen at a higher reduction degree as the flat region is larger in size.

The present invention in its second aspect provides a method of controlling an image display apparatus, the method comprising:

an acquisition step of acquiring a size of a flat region on the basis of an input image, this flat region, from among regions of the input image, being a region in which a change in gradation value in a spatial direction of the image is small; and an image processing step of performing unevenness reduction processing on the input image, this unevenness reduction processing reducing at least one of brightness unevenness and color unevenness of a screen at a higher reduction degree as the flat region is larger in size.

The present invention in its third aspect provides a non-transitory computer readable medium that stores a program, wherein the program causes a computer to execute the method.

According to the present invention, it is possible to reduce unevenness with high accuracy and suppress reduction in the brightness of a screen due to the reduction in the unevenness.

Further features of the present invention will become apparent from the following de script ion of exemplary embodiments with reference to the attached drawings.

DESCRIPTION OF THE EMBODIMENTS (First Embodiment)

Hereinafter, a description will be given, with reference to the drawings, of an image display apparatus and a method of controlling the image display apparatus according to a first embodiment of the present invention.

Note that although the first embodiment will describe an example of a case in which the image display apparatus is a transmission liquid-crystal display apparatus, any image display apparatus other than the transmission liquid-crystal display apparatus may be used. The image display apparatus may be an image display apparatus having an independent light source or an image display apparatus that emits light by itself. The image display apparatus may be, for example, a reflective liquid-crystal display apparatus. The image display apparatus may be a micro electromechanical system (MEMS) shutter display that uses a MEMS shutter instead of a liquid-crystal device. The image display apparatus may be an organic electro-luminescence (EL) display apparatus that has an organic EL device as a display device. The image display apparatus may be a plasma display apparatus that has a plasma device as a display device.

Figure 1:
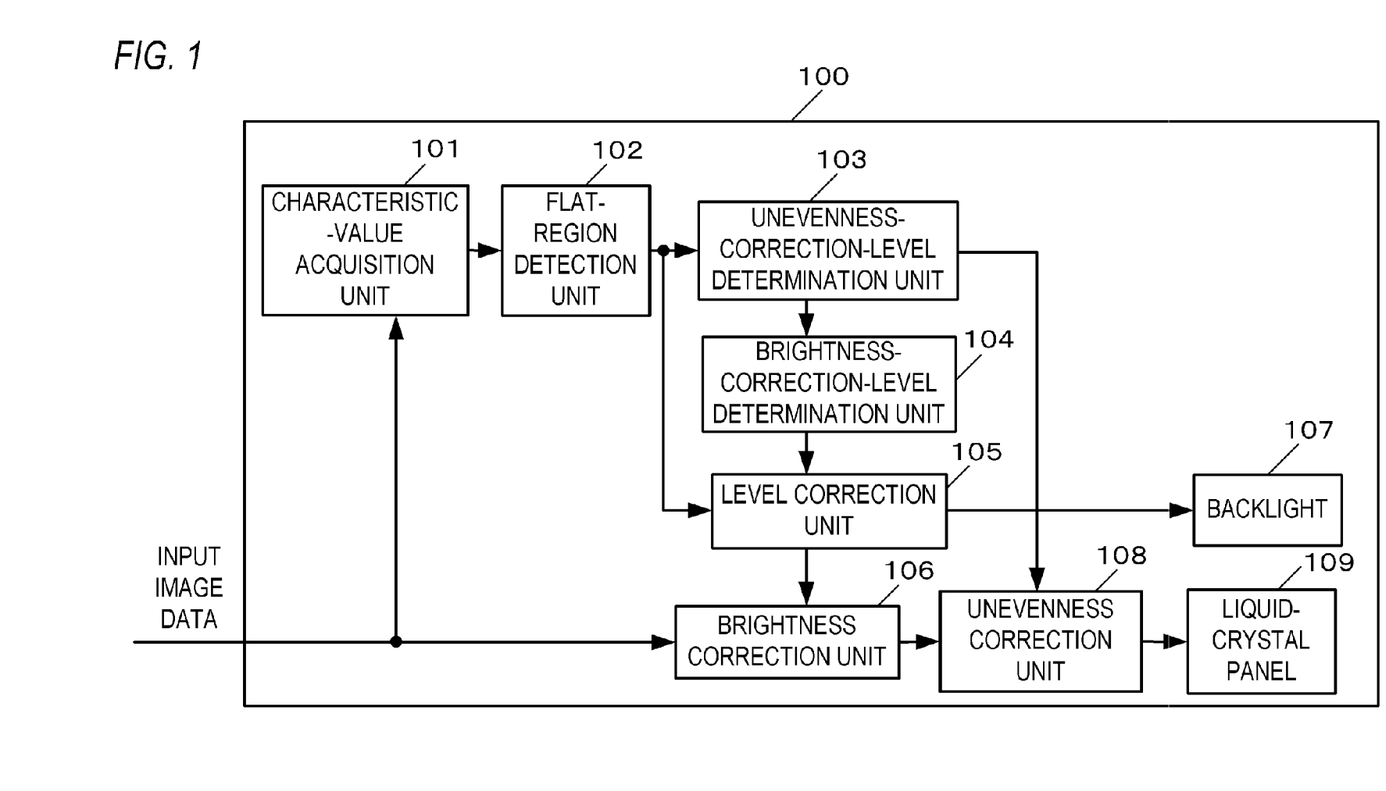
FIG. 1 is a block diagram showing an example of the functional configuration of an image display apparatus according to a first embodiment.

FIG. 1 is a block diagram showing an example of the functional configuration of an image display apparatus 100 according to the first embodiment.

As shown in FIG. 1, the image display apparatus 100 has a characteristic-value acquisition unit 101, a flat-region detection unit 102, an unevenness-correction-level determination unit 103, a brightness-correction-level determination unit 104, a level correction unit 105, a brightness correction unit 106, a backlight 107, an unevenness correction unit 108, a liquid-crystal panel 109, or the like.

The backlight 107 is a light-emission unit that applies light onto the back surface (surface on a side opposite to the screen) of the liquid-crystal panel 109. The backlight 107 emits light at reference light-emission brightness before light-emission brightness thereof is corrected by the level correction unit 105 that will be described later.

Note that the reference light-emission brightness may be a value set in advance by a manufacturer or a value adjustable by a user.

The liquid-crystal panel 109 is a display unit that modulates the light emitted from the backlight 107 to display an image on the screen. Specifically, the liquid-crystal panel 109 has a plurality of liquid-crystal devices, and the transmittance of each of the liquid-crystal devices is controlled according to image data. An image is displayed on the screen when the light emitted from the backlight 107 passes through each of the liquid-crystal devices at transmittance according to image data.

The characteristic-value acquisition unit 101 and the flat-region detection unit 102 acquire the size of a flat region based on an input image, the flat region among the regions of the input image being a region in which a change in gradation value in the spatial direction of the image is small. The input image is, for example, an image represented by the data of the input image input to the image display apparatus 100.

The characteristic-value acquisition unit 101 acquires a characteristic value from the data of the input image. In the first embodiment, the characteristic-value acquisition unit 101 acquires the gradation histogram of the input image as the characteristic value. Specifically, the characteristic-value acquisition unit 101 acquires the histogram (brightness histogram) of the brightness value of the input image as the characteristic value.

Figure 2:
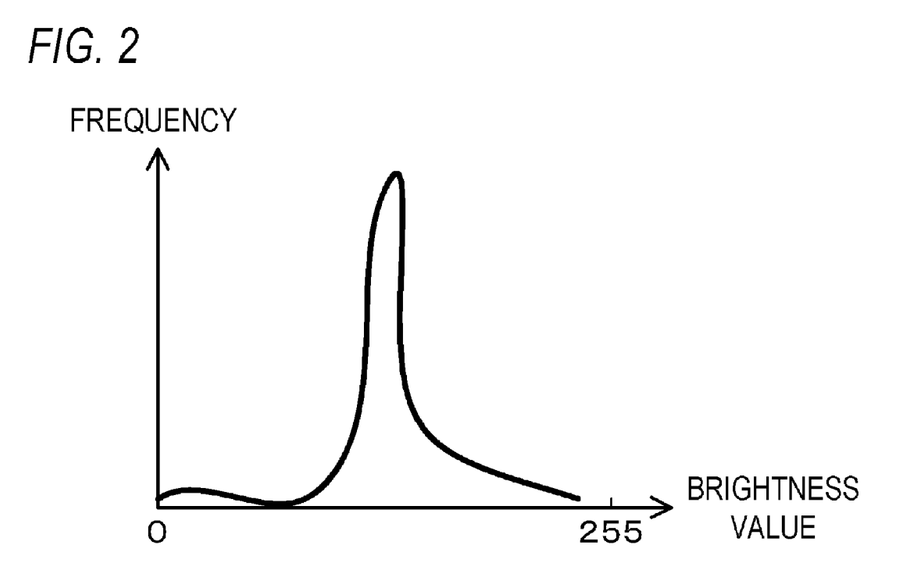
FIG. 2 is a diagram showing an example of the brightness histogram of an input image according to the first embodiment.

FIG. 2 shows an example of the brightness histogram of the input image. In FIG. 2, the horizontal axis represents a category, and the vertical axis represents a frequency (the number of pixels). FIG. 2 shows an example of a case in which the input image has 8 bits (in the range of 0 to 255 bits) as its gradation value (brightness value or pixel value). In addition, FIG. 2 shows an example of a case in which the category represents a brightness value. In other words, the brightness histogram shown in FIG. 2 represents the frequency of each brightness value.

Note that the number of the bits of the gradation value may be larger than or less than 8 bits.

Note that the range of the category of the gradation histogram is not particularly limited. For example, the category of the gradation histogram may be a gradation range including a plurality of gradation values. In other words, a histogram representing the frequency of each gradation range may be used as the gradation histogram.

Figure 3:
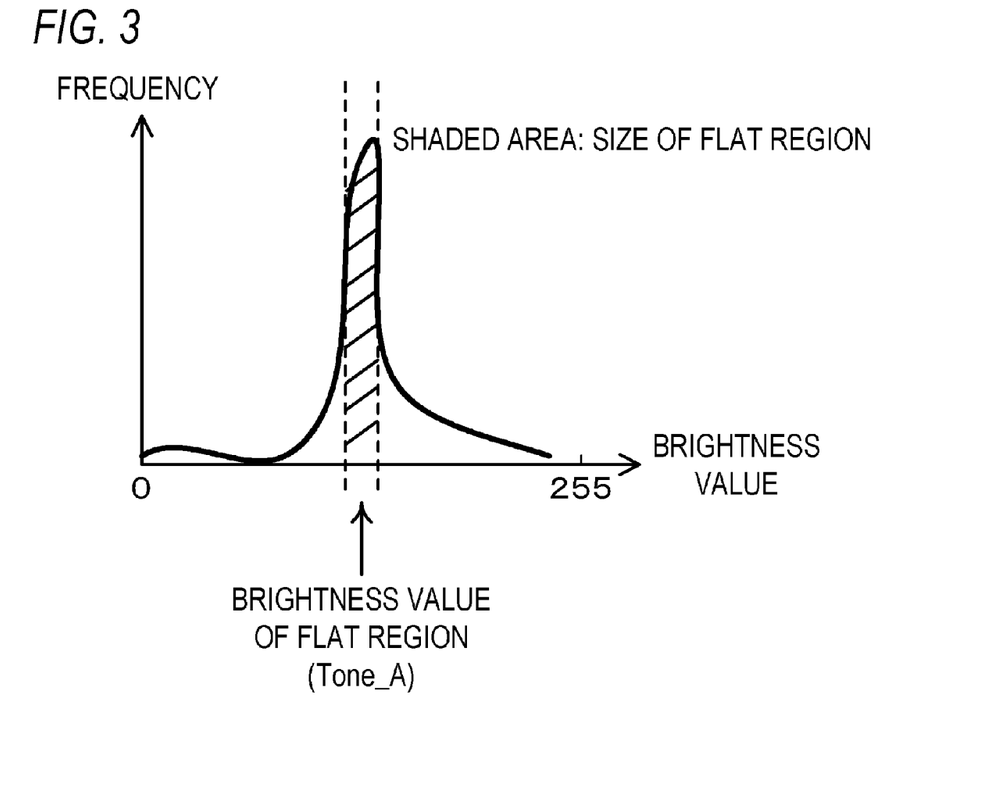
FIG. 3 is a diagram showing an example of the processing of a flat-region detection unit according to the first embodiment.

The flat-region detection unit 102 detects (acquires) the size and the gradation value of the flat region of the input image based on the characteristic value acquired by the characteristic-value acquisition unit 101. In the first embodiment, as shown in FIG. 3, a total frequency in the category range between the category in which a frequency steeply rises and the category in which a frequency steeply falls in the brightness histogram of the input image is acquired as the size of the flat region of the input image. Specifically, the total frequency in the category range between the category in which the frequency rises with the inclination of a first threshold or more and the category in which the frequency falls with the inclination of a second threshold or less in the brightness histogram of the input image is acquired as the size of the flat region of the input image. Then, a brightness value in the category range is acquired as the brightness value (Tone_A) of the flat region of the input image. As such, a brightness value having a maximum frequency, a value (average value, maximum value, or minimum value) representing brightness values included in the category range, or the like is used.

Note that the first threshold value and the second threshold value may be values set in advance by a manufacturer or values adjustable by a user. Alternatively, one of the first threshold and the second threshold may be a value set in advance by the manufacturer and the other thereof may be a value adjustable by the user.

Note that although the first embodiment will describe an example of a case in which the brightness histogram is used as the characteristic value, any histogram may be used as the characteristic value. For example, the histogram of a pixel value (RGB value or YCbCr value) may be used as such. Even when the histogram of the pixel value is used, the size and the gradation value of the flat region may be acquired in the same way as when the brightness histogram is used.

Note that such a method is not the only method of acquiring the size and the gradation value of the flat region. For example, the total number of the pixels of a predetermined color included in the input image may be acquired as the size of the flat region, and the gradation value of the predetermined color may be used as the gradation value of the flat region. In this case, the total number of the pixels of the predetermined color may be acquired as the characteristic value. The predetermined color is, for example, a flesh color.

The input image is subjected to image processing by the unevenness-correction-level determination unit 103, the brightness-correction-level determination unit 104, the level correction unit 105, the brightness correction unit 106, and the unevenness correction unit 108. The image having been subjected to the image processing is input to the liquid-crystal panel 109 and displayed on the screen.

Specifically, the unevenness-correction-level determination unit 103 and the unevenness correction unit 108 perform unevenness reduction processing to reduce at least one of the brightness unevenness and the color unevenness of the screen.

The unevenness of the screen is easily noticeable at the flat region and hardly noticeable at regions other than the flat region. In addition, the unevenness of the screen is easily noticeable when the flat region is larger in size. In other words, when the image (flat image) in which the flat region is larger relative to the size of the screen is displayed, the unevenness of the screen easily causes a subjective interception feeling. On the other hand, when the image (non-flat image) in which the flat region is smaller relative to the size of the screen is displayed, the unevenness of the screen hardly causes the subjective interception feeling.

In the first embodiment, the unevenness reduction processing for reducing the unevenness of the screen is performed with a higher reduction degree when the flat region acquired by the flat-region detection unit 102 is larger in size.

Thus, in order to display a flat image, the unevenness of the screen is largely reduced with the acceptance of an increase in the difference between the brightness of an input image and the brightness of a display image. While, in order to display a non-flat image, importance is placed on suppressing an increase in the difference between the brightness of an input image and the brightness of a display image rather than largely reducing the unevenness of the screen.

Further, brightness correction processing for increasing the brightness of the image is performed by the brightness-correction-level determination unit 104, the level correction unit 105, and the brightness correction unit 106 so as to suppress (compensate for) reduction in the brightness of the screen due to the unevenness reduction processing. By the brightness correction processing, a change in γ-curve (corresponding relationship between the gradation value of the input image and the brightness of the screen) due to a change in the reduction degree of the unevenness may be suppressed.

Note that although the first embodiment will describe an example in which the input image (input image data) is first subjected to the brightness correction processing and the image (image data) having been subjected to the brightness correction processing is then subjected to the unevenness reduction processing, the input image may be first subjected to the unevenness reduction processing and the image having been subjected to the unevenness reduction processing may be then subjected to the brightness correction processing.

Figure 4:
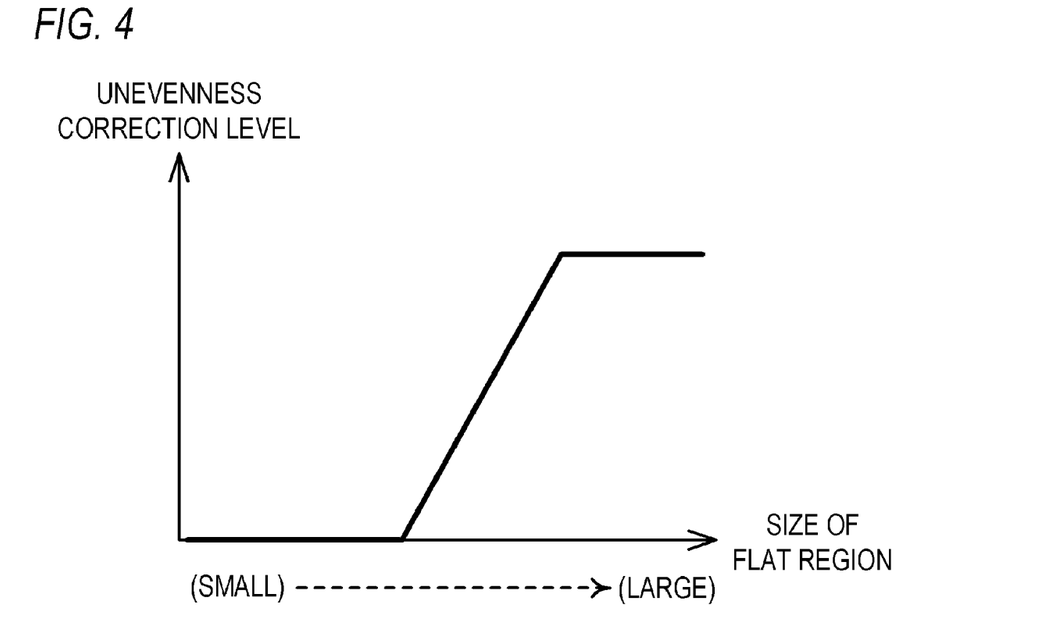
FIG. 4 is a diagram showing an example of unevenness correction information according to the first embodiment.

The unevenness-correction-level determination unit 103 determines an unevenness correction level representing the reduction degree of the unevenness according to the size of the flat region acquired by the flat-region detection unit 102. In the first embodiment, unevenness correction information (table or function) representing the corresponding relationship between the size of the flat region and the unevenness correction level is set in advance as shown in FIG. 4. Further, the unevenness-correction-level determination unit 103 acquires the unevenness correction level corresponding to the size of the flat region acquired by the flat-region detection unit 102 from the unevenness correction information. Using the unevenness correction information shown in FIG. 4, the unevenness-correction-level determination unit 103 acquires a larger unevenness correction level when the flat region acquired by the flat-region detection unit 102 is larger in size.

The unevenness correction unit 108 performs the unevenness reduction processing according to the unevenness correction level determined by the unevenness-correction-level determination unit 103. For example, the brightness of a region having high brightness on the screen is reduced by the unevenness reduction processing so as to coincide with the brightness of a region having low brightness on the screen.

The brightness-correction-level determination unit 104 determines a brightness correction level (Gain_Sig1) representing a brightness gain by the brightness correction processing according to the unevenness correction level determined by the unevenness-correction-level determination unit 103. For example, when the brightness of the screen is reduced by 10% with the unevenness reduction processing corresponding to the unevenness correction level determined by the unevenness-correction-level determination unit 103, the brightness-correction-level determination unit 104 determines the brightness correction level so as to increase the brightness by 10% with the brightness correction processing.

In the first embodiment, the brightness-correction-level determination unit 104 calculates the brightness correction level (Gain_Sig1) using the following formula 1. In formula 1, D_ratio represents the reduction ratio of the brightness of the screen with the unevenness reduction processing. Formula 1 is a formula in a case in which the value of the γ-curve (γ-characteristics) of the image display apparatus is 1.0. According to formula 1, Gain_Sig1=(100+10)/100=1.1 is obtained when the brightness of the screen is reduced by 10% with the unevenness reduction processing. By the multiplication of each gradation value of the image by the brightness correction level (Gain_Sig1), the brightness of the image may be increased so as to suppress the reduction in the brightness of the screen due to the unevenness reduction processing.

$$\text{Gain\_Sig1}=(100+D\_\text{ratio})/100 \qquad \text{(Formula 1)}$$

In the image processing (each of the brightness correction processing and the unevenness reduction processing) of the first embodiment, a gradation value having been subjected to the image processing is limited to its upper-limit value when exceeding the upper-limit value.

Such a limitation of the gradation value is not preferable since it causes degradation in image quality.

Therefore, in the first embodiment, based on the gradation value of the flat region of a target image that is to be subjected to the brightness correction processing and the upper-limit value of the gradation value, the brightness correction processing for increasing the brightness of the target image is performed so as not to allow the gradation value of the flat region of the target image to exceed the upper-limit value. With such brightness correction processing, it is possible to suppress the limitation of the gradation value in the flat region described above and suppress degradation in the image quality of the flat region.

In the first embodiment, the "target image" is the input image, and the "gradation value of the flat region of the target image" is the gradation value acquired by the flat-region detection unit 102.

Note that in a case in which the input image is subjected to the unevenness reduction processing and the brightness correction processing in this order, the image having been subjected to the unevenness reduction processing is the "target image." Further, a value representing gradation values having been subjected to the unevenness reduction processing of a plurality of pixels (plurality of pixels constituting the flat region) detected by the flat-region detection unit 102 is used as the "gradation value of the flat region of the target image." The "plurality of pixels constituting the flat region" includes the plurality of pixels in the category range between the category in which a frequency steeply rises and the category in which a frequency steeply falls in the gradation histogram of the input image. The representing value is a maximum value, a minimum value, an average value, a mode, an intermediate value, or the like.

The level correction unit 105 determines the brightness correction level for the brightness correction processing based on the gradation value of the flat region of the target image and the upper-limit value of the gradation value.

The level correction unit 105 determines whether the gradation value (Tone_A) of the flat region of the target image and the brightness correction level (Gain_Sig1) determined by the brightness-correction-level determination unit 104 satisfy the following formula 2. In formula 2, the value 255 represents the upper-limit value of the gradation value. That is, the level correction unit 105 determines whether the gradation value of the flat region having been subjected to the brightness correction processing exceeds the upper-limit value when the brightness correction processing is performed using the brightness correction level (Gain_Sig1) determined by the brightness-correction-level determination unit 104.

$$\text{Tone}\_A \times \text{Gain}\_\text{Sig1} \leq 255 \quad \text{(Formula 2)}$$

When the gradation value Tone_A and the brightness correction level Gain_Sig1 satisfy formula 2, the level correction unit 105 determines that the gradation value of the flat region having been subjected to the brightness correction processing does not exceed the upper-limit value when the brightness correction processing is performed using the brightness correction level Gain_Sig1. Then, the level correction unit 105 sets the brightness correction level Gain_Sig1 for the brightness correction unit 106.

On the other hand, when the gradation value Tone_A and the brightness correction level Gain_Sig1 do not satisfy formula 2, the level correction unit 105 determines that the gradation value of the flat region having been subjected to the brightness correction processing exceeds the upper-limit value when the brightness correction processing is performed using the brightness correction level Gain_Sig1. Then, the level correction unit 105 corrects the brightness correction level Gain_Sig1 using the following formula 3 to acquire a brightness correction level (Gain_Sig2). After that, the level correction unit 105 sets the brightness correction level Gain_Sig2 for the brightness correction unit 106.

$$\text{Gain}\_\text{Sig2} = 255/\text{Tone}\_A \quad \text{(Formula 3)}$$

The brightness correction unit 106 performs the brightness correction processing corresponding to the brightness correction level set by the level correction unit 105. That is, when the gradation value Tone_A and the brightness correction level Gain_Sig1 satisfy formula 2, the brightness correction unit 106 performs the brightness correction processing in which each gradation value of the target image is multiplied by the brightness correction level Gain_Sig1. On the other hand, when the gradation value Tone_A and the brightness correction level Gain_Sig1 do not satisfy formula 2, the brightness correction unit 106 performs the brightness correction processing in which each gradation value of the target image is multiplied by the brightness correction level Gain_Sig2.

Note that although the above first embodiment describes the case in which each gradation value is multiplied by the coefficient (brightness gain) in the brightness correction processing, the brightness correction processing is not limited to this. For example, processing for adding an addition value to each gradation value may be performed as such.

As described above, the gradation value has its upper-limit value. Therefore, there is also an upper limit in a correction amount (brightness gain) of the brightness correction processing, and thus reduction in the brightness of the screen due to the unevenness reduction processing may not be fully suppressed by the brightness correction processing. Specifically, when the gradation value Tone_A and the brightness correction level Gain_Sig1 do not satisfy formula 2, the brightness correction level Gain_Sig2 smaller than the brightness correction level Gain_Sig1 is used in the brightness correction processing. Therefore, when the gradation value Tone_A and the brightness correction level Gain_Sig1 do not satisfy formula 2, the reduction in the brightness of the screen due to the unevenness reduction processing is not fully suppressed by the brightness correction processing.

Note that when the gradation value Tone_A and the brightness correction level Gain_Sig1 do not satisfy formula 2, the gradation value having exceeded its upper-limit value is set at the upper-limit value even if the brightness correction level Gain_Sig1 is used in the brightness correction processing. Therefore, the reduction in the brightness of the screen due to the unevenness reduction processing is not fully suppressed by the brightness correction processing.

In order to address this problem, in the first embodiment, the level correction unit 105 increases, when the reduction in the brightness of the screen due to the unevenness reduction processing is not fully suppressed by the brightness correction processing, the light-emission brightness of the backlight 107 so as to suppress the reduction in the brightness of the screen not fully suppressed by the brightness correction processing (light-emission correction processing). By the light-emission correction processing, a change in γ-curve due to a change in the reduction degree of the unevenness may be suppressed.

Specifically, when the gradation value Tone_A and the brightness correction level Gain_Sig1 do not satisfy formula 2, the level correction unit 105 performs the light-emission correction processing. On the other hand, when the gradation value Tone_A and the brightness correction level Gain_Sig1 satisfy formula 2, the level correction unit 105 does not perform the light-emission correction processing.

In the first embodiment, the processing for increasing the light-emission brightness of the backlight 107 is performed as the light-emission correction processing so as to suppress the reduction in the brightness of the screen not fully suppressed at the flat region. Such light-emission correction processing is performed based on a reduction amount of the brightness of the screen due to the unevenness reduction processing, the gradation value of the flat region of the target image, and the upper-limit value of the gradation value.

Specifically, when the gradation value Tone_A and the brightness correction level Gain_Sig1 do not satisfy formula 2, the level correction unit 105 calculates the gain (Gain_BL) of the light-emission brightness of the backlight 107 using the following formula 4. Then, the level correction unit 105 corrects the light-emission brightness of the backlight 107 into a value obtained by multiplying the reference light-emission brightness by the gain (Gain_BL).

$$\text{Gain}\_\text{BL} = \text{Gain}\_\text{Sig1} - \text{Gain}\_\text{Sig2} \quad \text{(Formula 4)}$$

Note that the method of correcting the light-emission brightness is not limited to the above method. For example, an addition value added to the light-emission brightness may be determined as a correction value used to correct the light-emission brightness instead of the gain (Gain_BL) multiplied to the light-emission brightness.

As described above, according to the first embodiment, the unevenness of the screen is reduced with a higher reduction degree when a flat region is larger in size. Therefore, the unevenness of the screen may be reduced with high accuracy, and reduction in the brightness of the screen due to the reduction of the unevenness of the screen may be suppressed. Specifically, the unevenness of the screen may be reduced with an appropriate reduction degree depending on to what extent the unevenness of the screen is easily visually-recognized. More specifically, since a higher value is set as a reduction degree for the unevenness of the screen with respect to an image (for example, an image of the sky) whose unevenness is easily visually-recognized on the screen, the unevenness of the screen may be largely reduced by the unevenness reduction processing. On the other hand, a small value is set as a reduction degree for the unevenness of the screen with respect to an image (for example, an image of trees) whose unevenness is hardly visually-recognized on the screen. Therefore, reduction in the brightness of the screen due to the unevenness reduction processing may be suppressed, and reduction in the dynamic range of a display image (image displayed on the screen) may be suppressed.

In addition, since the brightness correction processing and the light-emission correction processing are performed in the first embodiment, a change in γ-curve due to a change in the reduction degree of the unevenness may be suppressed.

Note that the brightness correction processing and the light-emission correction processing may not be performed.

Note that the above first embodiment describes the exemplary case in which both the brightness correction processing and the light-emission correction processing are performed as the processing for suppressing a change in γ-curve due to a change in the reduction degree of the unevenness. However, the example is not limited to such an exemplary case. For example, only one of the brightness correction processing and the light-emission correction processing may be performed. When only the light-emission correction processing is performed, the light-emission brightness of the backlight is increased by the light-emission correction processing so as to suppress reduction in the brightness of the screen due to the unevenness reduction processing rather than suppressing reduction in the brightness of the screen not fully suppressed by the brightness correction processing.

(Second Embodiment)

Hereinafter, a description will be given, with reference to the drawings, of an image display apparatus and a method of controlling the image display apparatus according to a second embodiment of the present invention.

The above first embodiment describes the example in which a brightness correction level for the brightness correction processing is determined based on the gradation value of the flat region of a target image. Therefore, in the first embodiment, there is a likelihood that a gradation value having been subjected to the brightness correction processing exceeds its upper-limit value at regions other than a flat region and is limited to the upper-limit value.

The second embodiment will describe an example in which a brightness correction level for the brightness correction processing is determined based on the maximum value of the gradation value of a target image. In the second embodiment, the limitation of a gradation value may be suppressed with higher accuracy than the first embodiment.

Figure 5:
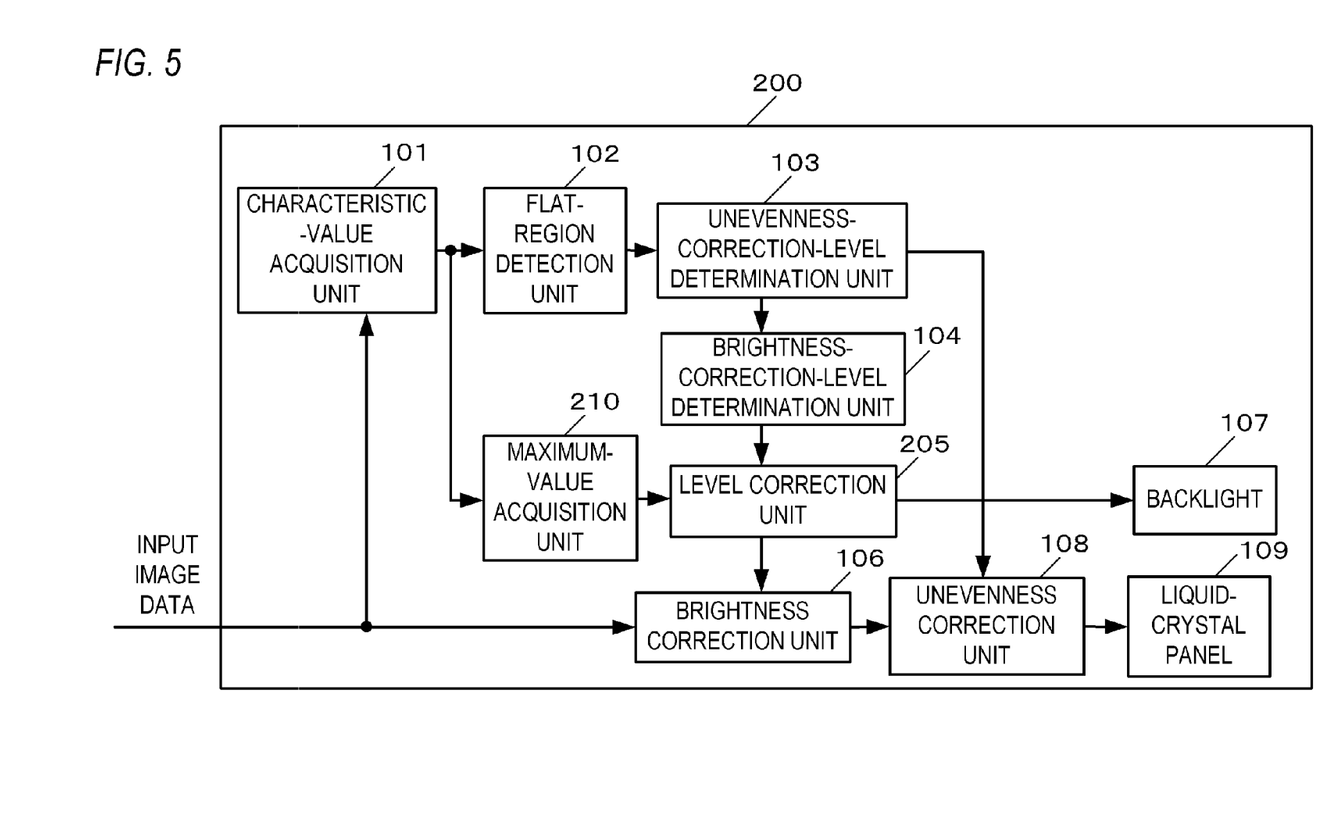
FIG. 5 is a block diagram showing an example of the functional configuration of an image display apparatus according to a second embodiment.

FIG. 5 is a block diagram showing an example of the functional configuration of an image display apparatus 200 according to the second embodiment.

As shown in FIG. 5, the image display apparatus 200 further has a maximum-value acquisition unit 210 besides the functional units shown in the first embodiment (FIG. 1).

Note that in the second embodiment, the processing of a level correction unit is different from that of the level correction unit 105 of the first embodiment. Therefore, in FIG. 5, the level correction unit is denoted by symbol 205 unlike the level correction unit 105 in FIG. 1.

In FIG. 5, functional units that perform the same processing as the functional units in FIG. 1 are denoted by the same symbols and descriptions thereon will be omitted.

Note that since the gradation value of a flat region is not used in the second embodiment, a flat-region detection unit 102 may not acquire the gradation value of the flat region.

The maximum-value acquisition unit 210 acquires the maximum value of the gradation value of a target image (input image in the second embodiment) that is to be subjected to brightness correction processing. In the second embodiment, the maximum value of the gradation value of the target image is acquired based on a characteristic value acquired by a characteristic-value acquisition unit 101.

Note that the method of acquiring the maximum value of the gradation value is not limited to the above method. The maximum value of the gradation value may be acquired by the analysis of the target image.

In the second embodiment, the brightness correction processing for increasing the brightness of the target image is performed based on the maximum value of the gradation value of the target image and the upper-limit value of the gradation value so as not to allow the maximum value of the gradation value of the target image to exceed its upper-limit value. By the brightness correction processing, the limitation of the gradation value described above may be suppressed in the entire region of the image, and degradation in the image quality of the entire image may be suppressed.

The level correction unit 205 acquires the maximum value of the gradation value of the target image from the maximum-value acquisition unit 210. Then, the level correction unit 205 determines a brightness correction level for the brightness correction processing based on the maximum value of the gradation value of the target image and the upper-limit value of the gradation value.

The level correction unit 205 determines whether the maximum value (Tone_B) of the gradation value of the target image and the brightness correction level (Gain_Sig1) determined by the brightness-correction-level determination unit 104 satisfy the following formula 5. That is, the level correction unit 205 determines whether the gradation value of the maximum pixel having been subjected to the brightness correction processing exceeds its upper-limit value when the brightness correction processing is performed using the brightness correction level (Gain_Sig1) determined by the brightness-correction-level determination unit 104. The maximum pixel is a pixel whose gradation value is the maximum value (Tone_B) among the pixels of the target image.

$$\text{Tone\_}B \times \text{Gain\_Sig1} \leq 255 \qquad \text{(Formula 5)}$$

When the maximum value Tone_B and the brightness correction level Gain_Sig1 satisfy formula 5, the level correction unit 205 determines that the gradation value of the maximum pixel having been subjected to the brightness correct on processing does not exceed the upper-limit value even if the brightness correction processing is performed using the brightness correction level Gain_Sig1. Then, the level correction unit 205 sets the brightness correction level Gain_Sig1 for the brightness correction unit 106.

On the other hand, when the maximum value Tone_B and the brightness correction level Gain_Sig1 do not satisfy formula 5, the level correction unit 205 determines that the gradation value of the maximum pixel having been subjected to the brightness correction processing exceeds the upper-limit value when the brightness correction processing is performed using the brightness correction level Gain_Sig1. Then, the level correction unit 205 corrects the brightness correction level Gain_Sig1 using the following formula 6 to acquire a brightness correction level (Gain_Sig2). After that, the level correction unit 205 sets the brightness correction level Gain_Sig2 for the brightness correction unit 106.

$$Gain\_Sig2 = 255/Tone\_B \quad \text{(Formula 6)}$$

When the maximum value Tone_B and the brightness correction level Gain_Sig1 do not satisfy formula 5, the level correction unit 205 performs light-emission correction processing. On the other hand, when the maximum value Tone_B and the brightness correction level Gain_Sig1 satisfy formula 5, the level correction unit 205 does not perform the light-emission correction processing.

In the second embodiment, the processing for increasing the light-emission brightness of a backlight 107 is performed as the light-emission processing so as to suppress reduction in the brightness of the screen not fully suppressed at the maximum pixel. Such light-emission correction processing is performed based on a reduction amount of the brightness of the screen due to unevenness reduction processing, the maximum value of the gradation value of the target image, and the upper-limit value of the gradation value.

Specifically, when the maximum value Tone_B and the brightness correction level Gain_Sig1 do not satisfy formula 5, the level correction unit 205 calculates the gain (Gain_BL) of the light-emission brightness of the backlight 107 using the above formula 4. Then, the level correction unit 205 corrects the light-emission brightness of the backlight 107 into a value obtained by multiplying reference light-emission brightness by the gain (Gain_BL).

As described above, according to the second embodiment, the unevenness of the screen may be reduced with high accuracy, and reduction in the brightness of the screen due to the reduction in the unevenness of the screen may be suppressed like the first embodiment.

In addition, since the brightness correction processing and the light-emission correction processing are performed in the second embodiment, a change in γ-curve due to a change in the reduction degree of the unevenness may be suppressed.

Moreover, in the second embodiment, the brightness correction level for the brightness correction processing is determined based on the maximum value of the gradation value of the target image. Therefore, in the second embodiment, the limitation of a gradation value may be suppressed with higher accuracy than the first embodiment.

Note that the configurations of the first and second embodiments are only for illustration purposes and the present invention may be appropriately modified within the range of a technical idea. For example, the processing described in the first and second embodiments may be applied to each of a plurality of separate regions constituting the screen. Specifically, for each of the separate regions, the unevenness of the separate region may be reduced (unevenness reduction processing) depending on a reduction degree corresponding to the size of the flat region of an image that is to be displayed in the separate region. Then, for each of the separate regions, the brightness correction processing and the light-emission correction processing may be performed corresponding to the unevenness reduction processing for the separate region. Under such a configuration, the backlight may have a configuration that allows local dimming control. For example, the backlight may have a light source for each of the separate regions. Further, before the light-emission brightness of the backlight is corrected by the level correction unit, the light source of the separate region may emit light for each of the separate regions with light-emission brightness based on an image that is to be displayed in the separate region.

<Other Embodiments>

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-095749, filed on May 7, 2014, which is hereby incorporated by reference herein in its entirety.

What is claimed is:

1. An image display apparatus comprising a processor configured to:
   acquire a size of a flat region on the basis of an input image, this flat region, from among regions of the input image, being a region in which a change in gradation value in a spatial direction of the input image is small; and
   perform unevenness reduction processing on the input image, this unevenness reduction processing reducing at least one of brightness unevenness and color unevenness of a screen at a higher reduction degree, for the entire screen, as the flat region is larger in size.

2. The image display apparatus according to claim 1, wherein
   the processor acquires, as the size of the flat region, a total frequency in a category range between a category in which a frequency rises with an inclination of a first threshold or more and a category in which a frequency falls with an inclination of a second threshold or less in a gradation histogram of the input image.

3. The image display apparatus according to claim 1, wherein the processor acquires, as the size of the flat region, a total number of pixels of a predetermined color included in the input image.

4. The image display apparatus according to claim 1, wherein
the processor further performs brightness correction processing on the input image, this brightness correction processing increasing brightness of the image on the basis of the reduction degree so as to suppress reduction in brightness of the screen occurring due to the unevenness reduction processing.

5. The image display apparatus according to claim 4, further comprising:
a backlight; and
a display panel configured to display the image on the screen by modulating light emitted from the backlight;
wherein the processor is configured to increase, when the reduction in the brightness of the screen occurring due to the unevenness reduction processing is not fully suppressed by the brightness correction processing, light-emission brightness of the backlight so as to suppress the reduction in the brightness of the screen not fully suppressed by the brightness correction processing.

6. The image display apparatus according to claim 5, wherein
the brightness of a target image that is to be subjected to the brightness correction processing is increased by the brightness correction processing so as not to allow the gradation value of the flat region of the target image to exceed an upper-limit value of the gradation value on the basis of the gradation value of the flat region of the target image and the upper-limit value, and
the processor increases, based on a reduction amount of the brightness of the screen occurring due to the unevenness reduction processing, the gradation value of the flat region of the target image, and the upper-limit value, the light-emission brightness of the backlight so as to suppress the reduction in the brightness of the screen not fully suppressed at the flat region.

7. The image display apparatus according to claim 5, wherein
the brightness of a target image that is to be subjected to the brightness correction processing is increased by the brightness correction processing so as not to allow a maximum value of the gradation value of the target image to exceed an upper-limit value of the gradation value on the basis of the maximum value of the gradation value of the target image and the upper-limit value, and
the processor increases, based on a reduction amount of the brightness of the screen occurring due to the unevenness reduction processing, the maximum value of the gradation value of the target image, and the upper-limit value, the light-emission brightness of the backlight so as to suppress the reduction in the brightness of the screen not fully suppressed at a pixel having the maximum value of the gradation value among pixels of the target image.

8. The image display apparatus according to claim 1, further comprising:
a backlight; and
a display panel configured to display the image on the screen by modulating light emitted from the backlight;
wherein the processor is configured to increase the light-emission brightness of the backlight so as to suppress the reduction in the brightness of the screen occurring due to the unevenness reduction processing.

9. The image display apparatus according to claim 1, wherein
in a case where the size of the flat region is not larger than a first size, the reduction degree of the unevenness reduction processing is a first value,
in a case where the size of the flat region is not smaller than a second size, the reduction degree of the unevenness reduction processing is a second value,
the second size is larger than the first size,
the second value is higher than the first value, and
the reduction degree of the unevenness reduction processing increases from the first value to the second value with increase in the size of the flat region from the first size to the second size.

10. A method of controlling an image display apparatus, the method comprising:
an acquisition step of acquiring a size of a flat region on the basis of an input image, this flat region, from among regions of the input image, being a region in which a change in gradation value in a spatial direction of the input image is small; and
an image processing step of performing unevenness reduction processing on the input image, this unevenness reduction processing reducing at least one of brightness unevenness and color unevenness of a screen at a higher reduction degree, for the entire screen, as the flat region is larger in size.

11. The method according to claim 10, wherein
in the acquisition step, a total frequency in a category range between a category in which a frequency rises with an inclination of a first threshold or more and a category in which a frequency falls with an inclination of a second threshold or less in a gradation histogram of the input image is acquired as the size of the flat region.

12. The method according to claim 10, wherein
in the acquisition step, a total number of pixels of a predetermined color included in the input image is acquired as the size of the flat region.

13. The method according to claim 10, wherein
in the image processing step, brightness correction processing is further performed on the input image, this brightness correction processing increasing brightness of the image on the basis of the reduction degree so as to suppress reduction in brightness of the screen occurring due to the unevenness reduction processing.

14. The method according to claim 13, wherein
the image display apparatus comprises:
a backlight; and
a display panel configured to display the image on the screen by modulating light emitted from the backlight; and
the method further comprises a light-emission correction step of increasing, when the reduction in the brightness of the screen occurring due to the unevenness reduction processing is not fully suppressed by the brightness correction processing, light-emission brightness of the backlight so as to suppress the reduction in the brightness of the screen not fully suppressed by the brightness correction processing.

15. The method according to claim 14, wherein
the brightness of a target image that is to be subjected to the brightness correction processing is increased by the brightness correction processing so as not to allow the gradation value of the flat region of the target image to exceed an upper-limit value of the gradation value on the basis of the gradation value of the flat region of the target image and the upper-limit value, and in the light-emission correction step, based on a reduction amount of the brightness of the screen occurring due to the unevenness reduction processing, the gradation value of the flat region of the target image, and the upper-limit value, the light-emission brightness of the backlight is increased so as to suppress the reduction in the brightness of the screen not fully suppressed at the flat region.

16. The method according to claim 14, wherein
the brightness of a target image that is to be subjected to the brightness correction processing is increased by the brightness correction processing so as not to allow a maximum value of the gradation value of the target image to exceed an upper-limit value of the gradation value on the basis of the maximum value of the gradation value of the target image and the upper-limit value, and in the light-emission correction step, based on a reduction amount of the brightness of the screen occurring due to the unevenness reduction processing, the maximum value of the gradation value of the target image, and the upper-limit value, the light-emission brightness of the backlight is increased so as to suppress the reduction in the brightness of the screen not fully suppressed at a pixel having the maximum value of the gradation value among pixels of the target image.

17. The method according to claim 10, wherein
the image display apparatus comprises:
a backlight; and
a display panel configured to display the image on the screen by modulating light emitted from the backlight; and the method further comprises a light-emission correction step of increasing the light-emission brightness of the backlight so as to suppress the reduction in the brightness of the screen occurring due to the unevenness reduction processing.

18. The method according to claim 10, wherein
in a case where the size of the flat region is not larger than a first size, the reduction degree of the unevenness reduction processing is a first value,
in a case where the size of the flat region is not smaller than a second size, the reduction degree of the unevenness reduction processing is a second value,
the second size is larger than the first size,
the second value is higher than the first value, and
the reduction degree of the unevenness reduction processing increases from the first value to the second value with increase in the size of the flat region from the first size to the second size.

19. A non-transitory computer readable medium that stores a program, wherein the program causes a computer to execute a method of controlling an image display apparatus, and the method comprises:
an acquisition step of acquiring a size of a flat region on the basis of an input image, this flat region, from among regions of the input image, being a region in which a change in gradation value in a spatial direction of the input image is small; and
an image processing step of performing unevenness reduction processing on the input image, this unevenness reduction processing reducing at least one of brightness unevenness and color unevenness of a screen at a higher reduction degree, for the entire screen, as the flat region is larger in size.

* * * * *